May 5, 1936.  J. DEL R. DE LAND  2,039,522
ORCHARD PROTECTIVE SYSTEM
Filed May 13, 1935
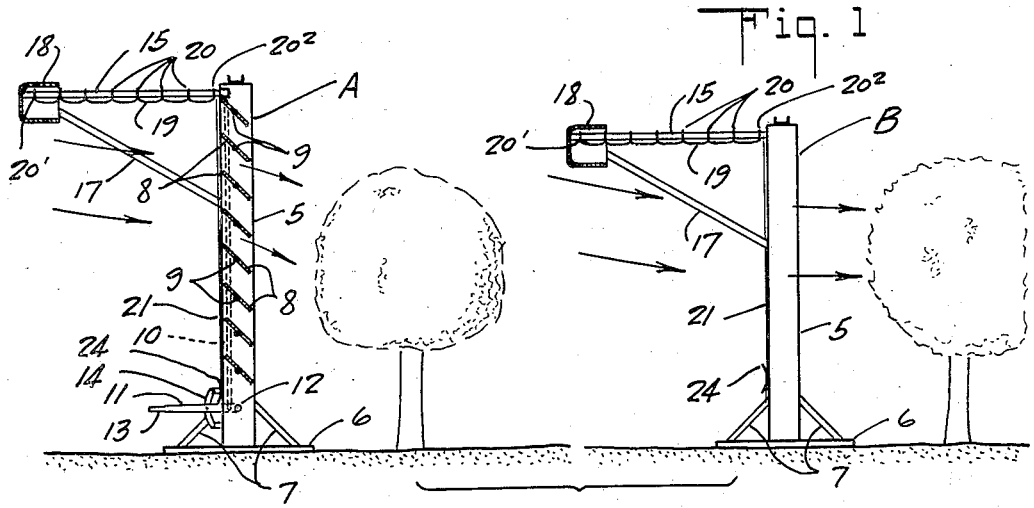
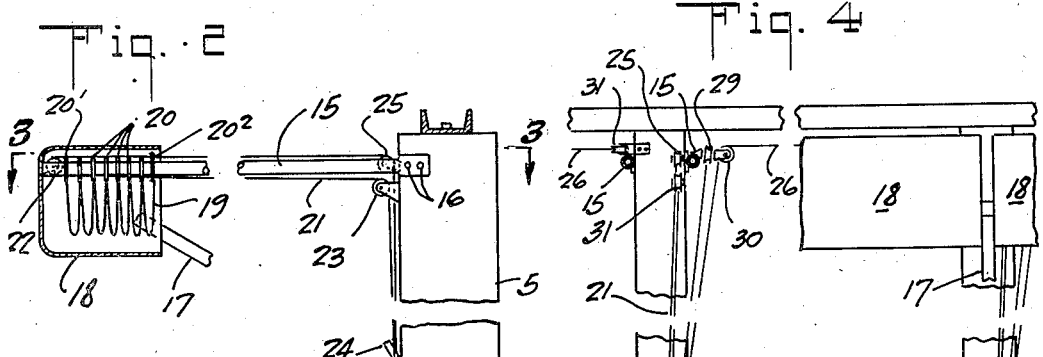
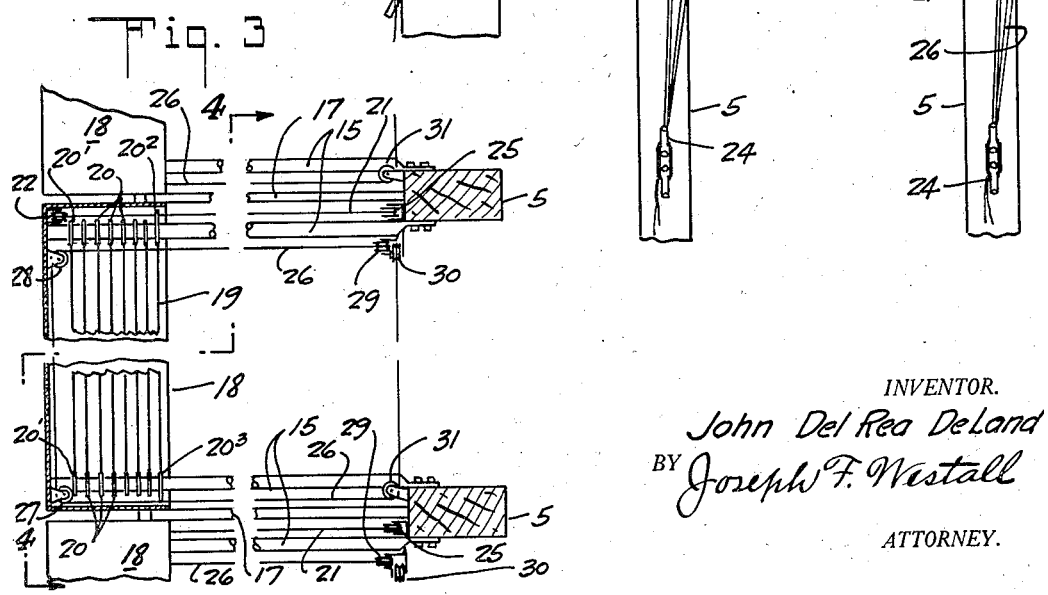
INVENTOR.
John Del Rea DeLand
BY Joseph F. Westall
ATTORNEY.

Patented May 5, 1936

2,039,522

UNITED STATES PATENT OFFICE 2,039,522

ORCHARD PROTECTIVE SYSTEM

John Del Rea De Land, Anaheim, Calif.

Application May 13, 1935, Serial No. 21,119

12 Claims. (Cl. 47—26)

This invention is an addition to or improvement of the protective system for orchards disclosed in my Patent No. 1,749,068, granted March 4, 1930, and is intended to increase adaptability of such invention to frost-prevention purposes. While retaining all the advantages of protection from injury by high winds, as explained in my said prior patent, the present improvement particularly relates to means for controlling thermal conditions at low temperatures in orchards, by deflecting and directing relatively warm currents of air from above through a grove.

As is well-known, particularly to citrus growers of California, killing frosts invariably occur during the early morning hours of still nights after a period of heat radiation from ground and trees, during which the relatively heated air gradually rises above the tree-tops, permitting formation of a moisture-laden, stagnant, and frigorific zone below. Under such conditions I have found that there is invariably a sufficient wind velocity in the warmer zone above the trees, which, with proper interception, downward deflection, and horizontal direction will carry through the grove, thus raising the temperature by the admixture of warmer air, and preventing the stagnant frost-favoring conditions above described.

It is obvious that low temperatures, even if substantially above freezing, will retard growth of citrus fruits; and I have also found that the proper application of the principles of my invention as hereinafter specifically described, to the minimization of low temperature extremes results in better fruit and increased production.

With the louver-boards of the frame forming part of the present invention, and being a principal essence of the subject-matter of my prior above-mentioned patent, set horizontally, I have been able to replace a quiescent state where there was practically no air current below the tree-tops, by creating a wind velocity of seven miles per hour through my orange grove, and have by such means also raised the temperatures of the grove by four or more degrees, incidentally, avoiding a costly, troublesome and air-polluting smudging operation.

In addition to the advantages obviously applicable to the present improvement, as set forth particularly with regard to the variational form shown in Fig. 6, in said Patent No. 1,749,068, a principal object of the present invention is to provide improved means for intercepting, deflecting, concentrating, and conducting relatively warm air currents from a higher stratum downwardly, to facilitate the creation of an air current through a grove, thus to raise the temperature around the trees and to neutralize a condition of stagnant quiescence most favorable to frost.

Another object is by minimizing extremes of low temperatures to increase growth and production, particularly of citrus fruits.

Still other objects, such for instance, as simplicity of construction, comparative ease of assembly, durability, and facility and efficiency of operation, will be obvious to those of skill in this art upon an examination of the disclosure hereof.

To the attainment of these ends and the accomplishment of such other new and useful objects as may appear, one embodiment of my invention, consisting in the features of novelty set forth in the construction, combination and arrangement of the several parts hereinafter more fully described and claimed, is illustrated in the accompanying drawing, in which:

Fig. 1 illustrates an orchard with principal parts of my invention shown partly in section and partly in elevation; a canvas awning forming part thereof being illustrated as in operative position;

Fig. 2 is an enlarged view partially in cross-section of important parts of air-current concentrating and directing means shown in Fig. 1 but showing said canvas awning in inoperative position, stored for protective purposes within its housing;

Fig. 3 is a view in horizontal section taken on lines 3—3 of Fig. 2;

Fig. 4 is a vertical sectional view on lines 4—4 of Fig. 3.

Referring to the drawing in detail, the numerals of which indicate similar parts throughout the several views, A (Fig. 1) designates a section of a louver-wall similar to that described in my said Patent No. 1,749,068, but provided with the additions and improvements of the present invention, located to the windward side of an orchard, as illustrated diagrammatically in Fig. 3 of said patent; B is a similar wall with like additions and improvements, but of less height than wall A and disposed parallel with wall A, preferably within the orchard between a first and second row of trees.

In such drawing, 5 designates each of a series of supporting posts for the louver-walls referred to, which posts extend in parallel lines on the windward side of the orchard to be protected, each having a foundation in a cement footing 6, and each being provided with braces 7 to reinforce its vertical position against heavy winds. Between posts 5 a series of adjustable louver-boards 8 are disposed, one above the other, so as to overlap like the slats of a Venetian blind when in closed position and end extensions of shafts 9 substantially coinciding with the longitudinal axes of said louver-boards are adjustably journalled in appropriate supports in posts 5 in a manner more particularly disclosed in Figs. 6 and 7 of my prior patent above referred to.

A rod or chain 10 interconnects louver-boards 8 to enable simultaneous adjustment of their angular positions with respect to the vertical axes of said louver-walls, such member 10 being connected to control lever 11 intermediate the ends of said control lever one end of said control lever being pivoted at 12 to post 5 and the opposite end 13 forming a handle for manual manipulation within a range permitted by a guide 14.

Extending at right angles windwardly from adjacent the top of each of posts 5 so as to be substantially parallel with each other are supporting arms 15, preferably of iron pipe, each being secured by any suitable means, as by bolts or screws 16 to its respective post 5. Outer ends of arms 15 may be supported by suitable braces 17 secured at lower inner ends to posts 5 in any suitable manner.

Extending longitudinally and supported by the outer ends of arms 15 is a hood or housing 18 preferably of sheet metal, U-shaped in cross-section, with its open side turned toward posts 5, which hood or housing is adapted to receive, for protective purposes when not in use, the canvas 19 in a manner which will shortly be explained.

A plurality of rings 20 slidable on each of said tubular arms 15 are provided as attachment supports for canvas awning 19, to which rings folds of the said awning are sewed or otherwise secured in any suitable manner, the outermost ring $20^1$ of each series being secured adjacent the end of its respective supporting arm 15 within housing 18, the innermost rings $20^2$ and $20^3$ being slidable with its supported fold of canvas to and fro between said posts and said housing, as most clearly shown by comparison of Figs. 1 and 2 of the drawing.

To draw canvas 19 from folded position within its housing 18, as shown in Fig. 2 of the drawing, thus to spread it in operative position from the outermost end of arms 15 to posts 5, as well as to reverse such operation and return said canvas 19 to folded position within said housing, I have provided a common form of tackle which will now be described: Referring particularly to Fig. 2, 21 indicates a rope which, being attached to innermost ring $20^2$, passes outwardly over pulley 22 and back beneath arm 15, over pulley 23, and down to and beyond cleat 24, which is located a convenient distance for manipulation from the ground, said rope 21 then passing upwardly over pulley 25, back along the top of arm 15 to its point of connection to ring $20^2$. Referring to Figs. 3 and 4, rope 26 being attached to ring $20^3$ passes within the housing over pulley 27 to pulley 28, back to pulley 29 and down to and for a convenient distance below cleat 24, thence upwardly from cleat 24 over pulley 30, along the louver-wall to pulley 31, and over pulley 31 to its point of attachment to ring $20^3$. The two ropes 20 and 26, each being double adjacent the cleat 24, thus enable manipulation of the canvas awning to and from its housing 18 from the same post.

In Fig. 1, arrows indicate the direction of the air current as it is deflected under the horizontal awning, and its downward momentum as it passes through the second louver-wall. While details of the louvers and their angular adjusting means are not shown in wall B, it will be understood that their arrangement and adjusting means will be substantially the same as those of wall A.

I do not limit myself to any particular height of louver walls nor to the proportional widths as shown in the drawing of the awning deflectors nor to their relative angles or locations; and while the deflecting awnings are illustrated as being supported in positions substantially horizontal to the louver walls, it will be obvious that the supporting arms for such awnings might be placed at an obtuse angle with respect to the walls, also may extend not necessarily from their tops but from a convenient point below, and that louver-boards may be non-adjustable and may be disposed otherwise than in vertical alignment, all of which suggested variations from the specific form shown in the drawing forming part hereof, I consider to be within the spirit of my invention.

It will also be quite obvious that other adjusting means for varying the angular positions of the louvers, if adjustable louvers be used, as well as for collapsing and spreading the canvas awning may, within the principle of my invention as above disclosed, be easily devised by the exercise of expected mechanical skill in the use and application of my said invention.

What I claim and desire to secure by Letters Patent is:

1. An orchard protective wind-control structure embodying a substantially vertical louver-wall erected adjacent the windward side of an orchard to be protected, the louver-boards of said wall being pivoted at their ends to permit a range of angular adjustment with respect to the vertical of said wall, means to adjust the angle of inclination of said louver-boards, and an awning extending horizontally from said wall to the windward thereof.

2. An orchard protective wind-control structure embodying a louver-wall erected adjacent the windward side of an orchard to be protected, and a collapsible awning adapted to be extended to the windward of said wall to confine air currents therebelow.

3. An orchard protective wind-deflecting structure embodying a plurality of posts set vertically adjacent the windward side of an orchard to be protected, said posts supporting a series of louver-boards, means to adjust the angle of said louver-boards with respect to the vertical axes of said posts to direct air currents passing through the louvers between said boards, and an air-current deflector extending from the windward side of the wall formed by said posts and said louver-boards to direct air currents through said louvers.

4. An orchard protective air-current directing structure comprising a pair of vertically disposed posts, a series of louver-boards pivotally mounted between said posts, means to adjust angular positions of said louver-boards with respect to the horizontal, a plurality of supporting arms extending from the windward side of said louver-board supports, and closure means for space between said supporting arms.

5. An orchard protective wind-control structure embodying a substantially vertical louver-wall erected adjacent the windward side of an orchard to be protected, a plurality of supporting arms extending at an angle from said louver wall, a collapsible awning fabric adapted to be spread between said arms, and means to spread and collapse said awning.

6. An orchard protective wind-control structure embodying a substantially vertical louver-wall erected adjacent the windward side of an orchard to be protected, a plurality of supporting arms extending at an angle from said louver-wall, an awning fabric adapted to be spread between said arms, a housing for said fabric, and means to draw said awning to and from said housing.

7. An orchard protective wind-control structure embodying a substantially vertical louver-wall erected adjacent the windward side of an orchard to be protected, a plurality of supporting arms extending at an angle from said louver-wall, a collapsible means to close the space between said supporting arms and adjacent said louver-wall and means to manipulate said collapsible closing means to and from collapsed position.

8. An orchard protective wind-control structure embodying a substantially vertical louver-wall erected adjacent the windward side of an orchard to be protected, a plurality of supporting arms extending at an angle from said louver-wall, means adapted to adjustably close space between said supporting arms, a second louver wall erected substantially parallel with, spaced from, and to the leeward of said first mentioned louver-wall, a plurality of supporting arms extending at an angle from said second louver-wall, means to adjustably close the space between said supporting arms of said second louver-wall and means to vary the angular adjustment of each of the series of louver-boards in said respective louver-walls.

9. An orchard protective wind-control structure embodying a plurality of substantially vertical supporting frames each carrying air current deflecting elements in spaced relation to each other, one or more of said frames being erected adjacent the windward side of an orchard to be protected, another or others of said frames being spaced from and to the leeward of said first-mentioned frame or frames and wind-deflecting means extending to the windward from each of said supporting frames.

10. An orchard protective wind-control structure embodying a plurality of substantially vertical louver walls, one or more of said walls being erected adjacent the windward side of an orchard to be protected, another or others of said walls being erected in spaced relation to and to the leeward of said first-mentioned wall or walls, and wind-deflecting means extending to the windward of a plurality of said walls.

11. An orchard protective wind-control structure embodying a plurality of substantially vertical louver walls, one or more of said walls being erected adjacent the windward side of an orchard to be protected, another or others of said walls being erected in spaced relation to and to the leeward of said first-mentioned wall or walls, means to adjust the respective angular positions of the louvers of said walls and wind-deflecting means extending to the windward of a plurality of said walls.

12. In apparatus of the character described, a substantially vertical support, a wind deflector carried by said support, a housing for said wind deflector, means to move said wind deflector into and out of said housing, and a lower wall carried by said support to further direct air deflected by said wind deflector.

JOHN DEL REA DE LAND.